J. B. Foote.
Sled-Way Attachment for Covered Roadways.
No. 88,704. Patented Apr. 6, 1869.
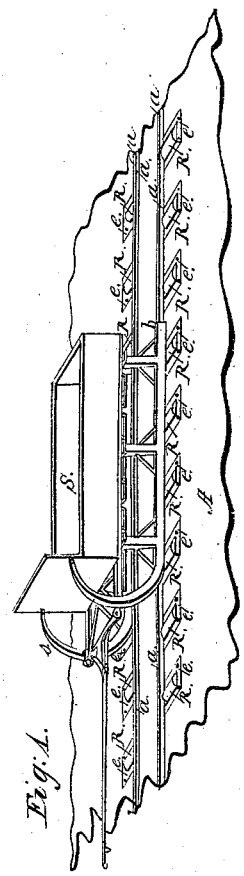
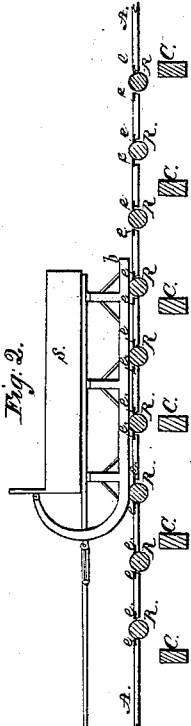
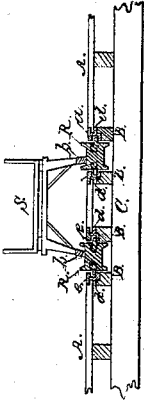
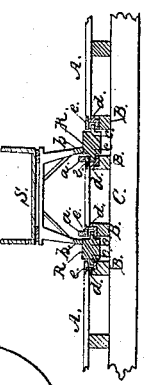
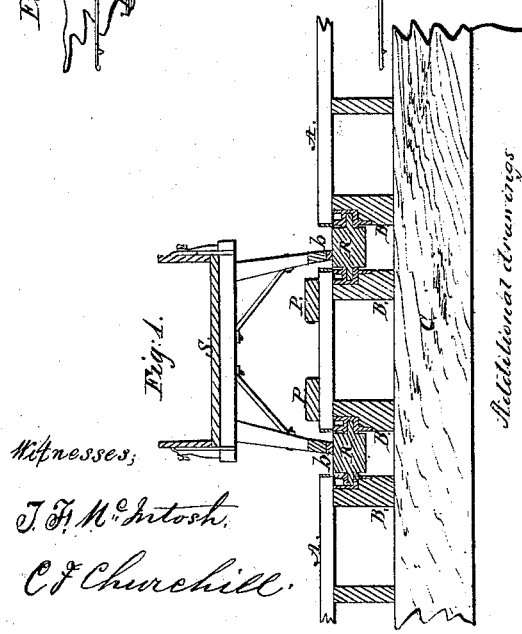
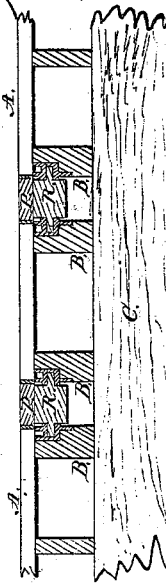
Witnesses:
J. H. McIntosh.
C. J. Churchill.
Inventor:
J. B. Foote

JAMES B. FOOTE, OF HAMDEN, ASSIGNOR TO ANDREW BUCKHAM, OF DELHI, NEW YORK.

Letters Patent No. 88,704, dated April 6, 1869.

SLED-WAY ATTACHMENT FOR COVERED ROADWAYS.

The Schedule referred to in these Letters Patent and making part of the same.

*To all whom it may concern:*

Be it known that I, JAMES B. FOOTE, of the town of Hamden, in the county of Delaware, and State of New York, have invented a new and useful improvement, whereby the crossing of the floors of covered bridges and other covered structures, such as barns, wagon-houses, sheds, &c., with sleighs, cutters, and other similar vehicles, during the winter-season, will be greatly facilitated; and I do hereby declare that the following is a full and exact description thereof, reference being had to the accompanying drawings, and to the letters of reference marked thereon, making a part of this specification, in which—

Figure 1 is a perspective view of my improvement, applied to the floor of a covered bridge or other covered structure.

Figure 2 is a longitudinal section of the same.

Figures 3, 4, and 5, are transverse sections of the same.

Figure 6 is a transverse section, showing the substitution of an iron block, in place of the rollers, during the summer.

Figure 1, additional drawing No. 1, is a transverse section, showing a method of application, in which the floor-planks act as guides for the runners of the sleigh or other similar vehicle.

Figure 2, additional drawing No. 1, is a transverse section, showing the rollers covered up, during the summer.

Like letters of reference indicate like parts—

A representing the floor, or floor-planks of a covered bridge or other covered structure.

B represents wooden string-pieces, supporting the boxes, or chairs in which the rollers revolve.

C represents the beams supporting the floors of covered bridges and other covered structures.

P represents planks to cover up the rollers with during the summer, and at the same time serve also as floor-planks.

R represents the rollers by means of which the passage over the floors of said covered bridges and other covered structures, with sleighs and other similar vehicles, is facilitated.

S represents a sleigh or other similar vehicle.

*a* represents guide-strips, to prevent the runners of the sleigh from getting off the rollers, when plain cylindrical rollers are used, in the manner shown in figs. 1 and 3.

*b* represents the runners of a sleigh or other similar vehicle.

*c* represents the journals of the rollers R.

*d* represents journal-boxes, or chairs, in which the rollers R revolve.

*e* represents metallic plates, to protect the edges of the holes in the floor in which the rollers revolve.

*f* represents iron blocks, which may be put in the place of the rollers during the summer-season, when wheeled vehicles are in use.

The nature of my invention consists in applying to, or combining with the floors of covered bridges and other covered structures, metallic or wooden rollers, arranged in two rows, as shown in the drawings, for the purpose of enabling sleighs and other similar vehicles to be drawn easily over them, the rollers being used as a substitute for snow, to lessen the friction caused by the rubbing of the sleigh-runners on the floors of said covered bridges and other covered structures.

To enable others skilled in the art to make and use my invention, I will proceed to describe its construction and operation.

R represents metallic or wooden rollers, provided with, or working on journals *c*, which journals work in journal-boxes, or chairs *d*.

These journal-boxes may be secured directly to the floor-planks, or secured to, or supported upon string-pieces, or joists B; or the journals may be made to work in plain pipe-boxes, let into said joists; or the journals may work in holes bored in the joists; or the rollers may be placed in frames or string-pieces framed together, and secured to the floor, as shown in fig. 5, the frames being made in convenient lengths, so that they may be removed from the floor or replaced, with ease, when desired.

The rollers R may be made either solid or hollow, as desired, and may be either a plain cylinder, as shown in fig. 3, or made with one or two flanges, somewhat in the form of a spool, as shown in figs. 4 and 5.

The rollers are arranged in two rows, as shown in figs. 1, 3, 4, and 5, and in figs. 1 and 2, additional drawing No. 1, the rollers in each row being placed at short distances apart, so that each runner of the sleigh or other similar vehicle may rest on two or more of the rollers at the same time, as shown in fig. 2, for the purpose of securing a steady motion to the sleigh or other similar vehicle while passing over them.

The distance at which each row of rollers is placed apart from the other, is determined by the distance at which the sleigh-runners are placed apart. In some sections of country, the runners of sleighs are placed three feet apart, while in other sections they are placed a little further apart. In nearly all cases, however, it is possible, by properly proportioning the length of the rollers, and the distance apart of the two rows of rollers, to accommodate all widths of sleighs generally used.

When these rollers are applied to, or combined with the floor of a covered bridge or other covered structure, with the intention of making them a permanent adjunct thereto, or part thereof, for the purposes above stated, they may be placed so that the top surfaces of the rollers will project just sufficiently above the top surface of the floor to keep the runners of the sleigh clear of the floor-planks, while passing over them, as shown in fig. 2, in which position they will not materially interfere with the passage of wheeled vehicles over the said floors.

When plain cylindrical rollers are applied in this manner, it will be necessary to use guide-strips $a$ $a$, figs. 1 and 3, made of metal or wood, or wood faced with metal, to prevent the runners of the sleigh from slipping off the rollers. But when flanged rollers are used, these guide-strips are not necessarily required, as the flanges themselves are sufficient to prevent the runners from slipping off. One flange on each roller is sufficient to prevent the runners from slipping off, but two flanges, as shown in fig. 4, may be used, if desired.

Another good method of application is shown in additional drawing No. 1, fig. 1, which represents a transverse section of the floor through the centre of the rollers.

In this mode, or method of application, the top surfaces of the rollers R R are placed below the general top surface of the floor-planks, the top surfaces of the rollers R R being about on a level with the under side of the floor-planks A A, the ends of which floor-planks come only to the ends of the rollers, as shown in the drawing, thus forming a continuous groove, or channel the whole length of the floor and the depth of the floor-planks, which acts as a guide for the runners $b$ $b$ of the sleigh S, while the same is passing over the floor on the rollers.

The edges, or ends of the floor-planks on each side of the groove may be faced with iron, to prevent the floor-planks from being worn by the sleigh-runners, if desired.

In the summer-season, or at any time when the rollers are not required for use, this groove, or channel is filled up by simply laying down planks P P in it, of the same thickness as the floor-planks, and of sufficient width to fill the grooves, and fastening them down to keep them in place, which, when properly done, will make the top surface of the floor of the same general level throughout, and the rollers, being thus all covered up by the planks P P, are protected from injury, and the top surface of the floor left free from any obstruction to the passage of wheeled vehicles, as shown in fig. 2, additional drawing No. 1.

In the winter-season, or at any time when the rollers are required for use, the lines of planks P P are lifted up out of the grooves, or channels, and laid aside, out of the way, until again required for filling up the grooves; or, if desired, the planks P P may be spiked down on the floor, between the grooves, as shown in fig. 1, additional drawing No. 1, thus forming an additional protective guide-strip, or guard, to prevent the runners $b$ $b$ of the sleigh S from getting off the rollers R R. This additional guard, however, is not actually necessary.

The space between the rollers, at the bottom of the grooves, or channels, is properly filled in with plank, so that the feet of the horses may not be injured, should they step into the grooves, care being taken that the rollers have freedom to revolve, and that the top surfaces of the rollers are sufficiently elevated above the top surface of the planking, at the bottom of the grooves, to keep the runners of the sleigh from rubbing on it.

This last-described method of application is well adapted to barn-floors, where grain and other seeds are threshed out, as the rollers can all be covered up, and the floor made level for threshing, and if the planks P P are made to fill up the grooves nicely, no grain or seeds can be lost through the openings, or holes in the floor in which the rollers revolve.

For convenience of repairs, the holes in the floor-planks, when the rollers are applied as described in either of the two last methods, should be cut large enough to admit of the rollers being lifted up out of their places at any time it may be desirable to do so; and, for like reasons, the journal-boxes should be constructed in such a manner as to admit of the rollers being taken out at any time desirable.

Metallic plates $e$ should also be used to protect the edges of the floor-planks at the holes in which the rollers revolve, as also to prevent the horses' feet from being caught in the space between the floor and the rollers, when the same are in use.

These plates are made with a hole to fit over that part of the rollers projecting above the surface of the floor-planking, which hole is just sufficiently large to allow the roller to revolve freely in it, the rest of the plate being sufficiently large to completely cover the hole in the floor-planking, the top surface of the plates being sunk to a level with the surface of the floor-planks, if desired.

If desired, the rollers may be made to revolve on journals passing through the rollers; but this method is somewhat objectionable, on account of the journal wearing more on one side than the other. If, therefore, for any particular reason, this method is used, it will be well to allow freedom of revolution to both the journal and roller, so that the journal, by occasionally turning, may present a fresh surface for the roller to revolve upon, and thus wear equally all around.

Metallic rollers should in all cases be used where it is possible to procure them, but wooden rollers may be used to accomplish the same results, if desired, in which case metallic journals should be used, if it is possible to procure them conveniently, as the strength of metallic journals, in proportion to their size, is far greater, and the friction less than wooden ones.

It will easily be perceived that two or more tracks, or double rows of rollers may be applied to the floor of a bridge at the same time, if desired, so that teams going in opposite directions may pass each other without loss of time; or, in the case of hotel-sheds or wagon-houses, that several vehicles may be accommodated on different tracks at the same time.

It is also evident that one row of rollers, sufficiently long to answer the purpose, might be used, instead of two rows of short rollers; but I do not consider they would so well accomplish the results required, or possess so many advantages, as with two rows of short rollers the strain on any one particular roller, or journal is less, the liability of being broken by a heavy-loaded wheeled vehicle passing over the centre of the roller is less, and the short ones are easier covered up and protected than long ones.

The advantages derived from the use of this invention are obvious. In the winter-season, when the roads are covered with snow, sleighs and other similar vehicles are generally used in travelling from one place to another, and are easily drawn over the snow-covered roads; but the floors of covered bridges and other covered structures, being destitute of snow, offer considerable resistance to the passage of said vehicles, on account of the great friction caused by the rubbing of the runners of the same upon the bare planks of the said floors.

This difficulty, however, is entirely obviated by the use of this invention, as the sleigh or other similar vehicle can be drawn over the said floors, upon the above-described rollers, with even more ease than they can be drawn over the snow-covered roads.

Having thus fully described my invention, and some of the modes, or methods which I deem best of applying it usefully,

What I claim as my invention, and desire to secure by Letters Patent is—

In combination with the floors of covered bridges and other covered structures, rollers arranged as shown, and for the purposes set forth in the above specification.

JAMES B. FOOTE.

Witnesses:
T. F. McINTOSH,
O. F. CHURCHILL.